US008473693B1

(12) United States Patent
Muppalaneni et al.

(10) Patent No.: US 8,473,693 B1
(45) Date of Patent: Jun. 25, 2013

(54) MANAGING OWNERSHIP OF MEMORY BUFFERS (MBUFS)

(75) Inventors: Nitin Muppalaneni, Sunnyvale, CA (US); Edward R. Zayas, Milpitas, CA (US); Douglas Santry, Cambridge (GB)

(73) Assignee: NetApp, Inc., Sunnyvale, CA (US)

( * ) Notice: Subject to any disclaimer, the term of this patent is extended or adjusted under 35 U.S.C. 154(b) by 1610 days.

(21) Appl. No.: 10/632,203

(22) Filed: Jul. 29, 2003

(51) Int. Cl.
*G06F 12/00* (2006.01)
*G06F 5/06* (2006.01)
*G06F 17/30* (2006.01)

(52) U.S. Cl.
CPC .......... *G06F 5/065* (2013.01); *G06F 17/30958* (2013.01); *G06F 2205/064* (2013.01)
USPC .............. 711/154; 710/56; 711/219; 707/781

(58) Field of Classification Search
CPC G06F 5/065; G06F 17/30958; G06F 2205/064
USPC ..................... 711/129, 154, 219; 707/100, 1, 707/781; 710/56
See application file for complete search history.

(56) References Cited

U.S. PATENT DOCUMENTS

| 3,883,847 | A | * | 5/1975 | Frank ............................. 711/206 |
| 5,440,726 | A | | 8/1995 | Fuchs et al. |
| 5,506,979 | A | * | 4/1996 | Menon ........................... 711/112 |
| 5,819,292 | A | | 10/1998 | Hitz et al. |
| 5,931,918 | A | * | 8/1999 | Row et al. ...................... 719/321 |
| 5,963,962 | A | | 10/1999 | Hitz et al. |
| 6,038,570 | A | | 3/2000 | Hitz et al. |
| 6,154,813 | A | * | 11/2000 | Martin et al. .................. 711/133 |
| 6,330,570 | B1 | | 12/2001 | Crighton |
| 6,389,513 | B1 | * | 5/2002 | Closson ......................... 711/129 |
| 6,434,620 | B1 | * | 8/2002 | Boucher et al. ............... 709/230 |
| 6,496,901 | B1 | * | 12/2002 | De Martine et al. .......... 711/113 |
| 6,697,846 | B1 | * | 2/2004 | Soltis ............................ 709/217 |
| 7,194,569 | B1 | * | 3/2007 | Shaylor ......................... 711/100 |
| 2002/0057697 | A1 | * | 5/2002 | Yamamori et al. ......... 370/395.2 |
| 2003/0131190 | A1 | | 7/2003 | Park et al. |
| 2005/0015564 | A1 | * | 1/2005 | Dierks et al. .................. 711/201 |

OTHER PUBLICATIONS

Cohen et al., A Dynamic Approach for Efficient TCP Buffer Allocation, IEEE, 1998, pp. 817-824.*
Santry, et al., U.S. Appl. No. 10/271,633, filed Oct. 15, 2002, titled Zero Copy Writes Through Use of Mbufs.

(Continued)

*Primary Examiner* — Cheyne Ly
(74) *Attorney, Agent, or Firm* — Cesari and McKenna, LLP

(57) ABSTRACT

The present invention provides techniques for managing ownership (i.e., control) of one or more memory buffer (mbuf) data structures within a network subsystem and a storage subsystem of a storage operating system implemented in a storage system. When the storage system receives data to be written to a storage medium, the network subsystem stores the received data in one or more variable-length chains of mbufs. Unlike conventional approaches, the received data is not subsequently copied out of the mbufs into fixed-sized data buffers for use by the storage subsystem. Instead, the storage subsystem can directly manipulate the received data stored in the mbufs. By eliminating the steps of copying data out of the mbufs and into fixed-sized data buffers, the invention reduces the amount of time and system resources consumed by the storage system when writing blocks of received data to disk storage.

15 Claims, 12 Drawing Sheets

OTHER PUBLICATIONS

Watanabe, et al., U.S. Appl. No. 09/898,894, filed Jul. 3, 2001, titled System and Method for Parallelized Replay of an NVRAM Log in a Storage Appliance.

David Hitz et al., TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al., (1999) Request for Comments (RFC) 2616, HTTP/1.1.

Wright et al., TCP/IP Illustrated, vol. 2, Chapter 2: MBUG+FS: Memory Buffers, pp. 31-61.

* cited by examiner

MANAGING OWNERSHIP OF MEMORY BUFFERS (MBUFS)

RELATED APPLICATIONS

This application is related to U.S. patent application Ser. No. 10/271,633, entitled ZERO COPY WRITES THROUGH USE OF MBUFS, by Douglas Santry, et al., the teachings of which are expressly incorporated herein by reference.

FIELD OF THE INVENTION

The present invention relates to file systems and, more specifically, to a technique for writing files within a file system onto a storage medium.

BACKGROUND OF THE INVENTION

A file server is a computer that provides file service relating to the organization of information on storage devices, such as disks. The file server or filer may be embodied as a storage system including a storage operating system that implements a file system to logically organize the information as a hierarchical structure of directories and files on the disks. Each "on-disk" file may be implemented as a set of disk blocks configured to store information, such as text, whereas the directory may be implemented as a speciallyformatted file in which information about other files and directories are stored.

A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages, usually in the form of packets, to the filer over the network.

As used herein, the term storage operating system generally refers to the computer-executable code operable on a storage system that manages data access and client access requests and may implement file system semantics in implementations involving filers. In this sense, the Data ONTAP™ storage operating system, available from Network Appliance, Inc. of Sunnyvale, Calif., which implements a Write Anywhere File Layout (WAFL™) file system, is an example of such a storage operating system implemented as a microkernel within an overall protocol stack and associated disk storage. The storage operating system can also be implemented as an application program operating over a general-purpose operating system, such as UNIX® or Windows NT®, or as a general-purpose operating system with configurable functionality, which is configured for storage applications as described herein.

The disk storage is typically implemented as one or more storage volumes that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent Disks (RAID). RAID implementations enhance the reliability/integrity of data storage through the redundant writing of data "stripes" across a given number of physical disks in the RAID group, and the appropriate storing of parity information with respect to the striped data. As described herein, a volume typically comprises at least one data disk and one associated parity disk (or possibly data/parity partitions in a single disk) arranged according to a RAID 4, or equivalent high-reliability, implementation.

Additionally, a filer may be made more reliable and stable in the event of a system shutdown or other unforeseen problem by employing a backup memory consisting of a non-volatile random access memory (NVRAM) as part of its architecture. An NVRAM is typically a large-volume solid-state memory array (RAM) having either a back-up battery, or other built-in last-state-retention capabilities (e.g. a FLASH memory), that holds the last state of the memory in the event of any power loss to the array.

Packets of information are received at a filer by a network subsystem comprising one or more integrated software layers that provide data paths through which clients access information stored in the filer. The received information is typically copied into memory buffer data structures or mbufs in the filer's "in-core" memory. The mbufs organize the received information in a standardized format that can be manipulated within the network subsystem. For instance, each mbuf typically comprises header and data portions of a predetermined size and format. Information stored in an mbuf may include a variety of different data types including, inter alia, source and destination addresses, socket options, user data and file access requests. Further, an mbuf also may reference information contained in a separate mbuf data section. Mbufs can be used as elements of larger data structures, e.g. linked lists, and are particularly useful in dynamically changing data structures since they can be created or removed "on the fly." A general description of mbuf data structures is provided in *TCP/IP Illustrated*, Volume 2 by Wright et al (1995) which is incorporated herein by reference.

A filer often receives information from a network as data packets of various lengths. Accordingly, these packets are received by the filer's network subsystem and are copied into variable length "chains" (e.g., linked lists) of mbufs. However, the filer's storage subsystem (e.g., including its file system) usually operates on fixed-sized blocks of data. For instance, the WAFL file system is configured to operate on data stored in contiguous 4 kilobyte (kB) blocks. Therefore, data received by the filer must be converted from the variable length mbufs used within the filer's network subsystem to fixed-sized data blocks that may be manipulated within its storage subsystem.

Conventionally, the process of converting data stored in mbufs to fixed-sized blocks involves copying the contents of the mbufs into one or more fixed-sized data buffers in the filer's memory. While the network subsystem maintains "ownership" (i.e., control) of the mbuf data structures, the fixed-sized data buffers instead are managed within the storage subsystem. After the mbufs' data has been copied into the fixed-sized data buffers, the network subsystem typically de-allocates the mbufs. More specifically, the de-allocated ("free") mbufs may be placed in a list or "pool" of free mbufs that later may be used to store new data packets received at the filer.

Problems often arise because a significant amount of time and system resources, such as memory and central processing unit (CPU) cycles, is typically required to copy received data from variable length mbufs to fixed-sized data buffers. Moreover, the consumption of time and resources becomes particularly noticeable when the contents of a large number of mbufs must be copied to fixed-sized data buffers before their contained data may be written to disk storage. It would therefore be desirable to minimize the number of times received data is copied from mbuf data structures into fixed-sized data buffers, e.g., in the process of writing the received data to disk storage.

SUMMARY OF THE INVENTION

The present invention provides techniques for managing ownership (i.e., control) of one or more memory buffer (mbuf) data structures within a network subsystem and a storage subsystem of a storage operating system implemented in a storage system. Data to be written to a storage medium in the storage system is received at the network subsystem and stored in one or more variable-length chains of mbufs. Unlike conventional approaches, the received data is not subsequently copied out of the mbufs into fixed-sized data buffers for use by the storage subsystem. Instead, the storage subsystem can directly manipulate the received data in the mbufs. By eliminating the steps of copying data out of the mbufs and into fixed-sized data buffers, the invention reduces the amount of time and system resources consumed by the storage system when writing the received data to disk storage. As a result, the storage system utilizes its memory more efficiently and increases the throughput of its write operations.

In the illustrative embodiments, a "write path" of the storage operating system is modified so the storage subsystem may directly manipulate data stored in mbuf data structures. However, the operating system's other file-access request paths, such as its "read path," remain unaltered. As used herein, the write path defines the code used by the storage operating system to process requests to WRITE data to a storage medium, and the read path defines the code used by the storage operating system to process requests to READ data from a storage medium. Those skilled in the art will appreciate that the write and read paths can be implemented as software code, hardware or some combination thereof.

Operationally, a request to WRITE user data to a storage medium is received at an interface of the storage system. The network subsystem copies the received data into one or more mbuf data structures, which may be stored in non-contiguous regions in the storage system's "in-core" memory. Because the storage system received a WRITE request, the received data is logically partitioned into contiguous, e.g., 4 kilobyte, data blocks that may be written to the storage medium. Advantageously, the received data is partitioned directly in the mbufs without copying the data into newly allocated data buffers. To that end, the storage subsystem generates sets of one or more buffer pointers that address various portions of the received data. The union of the data portions referenced by a set of buffer pointers defines a contiguous data block that may be written to the storage medium. Each set of buffer pointers is stored in a corresponding buffer header. According to the invention, mbuf data sections containing the partitioned data blocks are not de-allocated by the storage operating system until their data blocks are written to the storage medium.

In a first illustrative embodiment, the storage subsystem "shares" ownership of the mbuf data sections with the network subsystem. That is, both the storage subsystem and the network subsystem control when the mbuf data sections may be de-allocated. The network subsystem de-allocates the mbuf data sections based on the values of their respective "mbuf reference counts." Here, an mbuf data section's associated mbuf reference count indicates the number of mbufs referencing data stored in the data section. Accordingly, the network subsystem de-allocates an mbuf data section when the value of its associated mbuf reference count equals zero. The storage subsystem controls when each mbuf data section is de-allocated by preventing the mbuf data section's associated mbuf reference count from equaling zero until after the data section's contained data is written to the storage medium.

According to the first embodiment, for each buffer pointer generated by the storage subsystem, the storage subsystem also generates a "file-system proxy mbuf" through which the buffer pointer references a portion of the received data. The file-system proxy mbufs ensure that the values of the mbuf reference counts associated with the mbuf data sections storing the received data are greater than or equal to one. In this manner, the generated file-system proxy mbufs prevent their referenced mbuf data sections from being de-allocated by the network subsystem. Every time a contiguous block of the received data is written to the storage medium, the storage subsystem de-allocates the buffer header, buffer pointers and file-system proxy mbufs associated with the written data block. After the file-system proxy mbufs have been de-allocated, the network subsystem may then de-allocate those mbuf data sections whose mbuf reference counts equal zero.

In a second illustrative embodiment, control of the mbuf data structures storing the received data is transferred from the network subsystem to the storage subsystem. In this embodiment, the storage subsystem allocates a "reference-tracking" data structure comprising a reference count that is incremented every time the storage subsystem generates a set of buffer pointers defining a contiguous block of the received data. The reference count is decremented after every time a contiguous block of the received data is written to disk storage. Accordingly, the storage subsystem does not de-allocate the one or more mbufs storing the received data nor de-allocate their associated reference-tracking data structure until the reference count in their associated reference-tracking data structure equals zero.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

A. Storage System Environment

Figure 1:
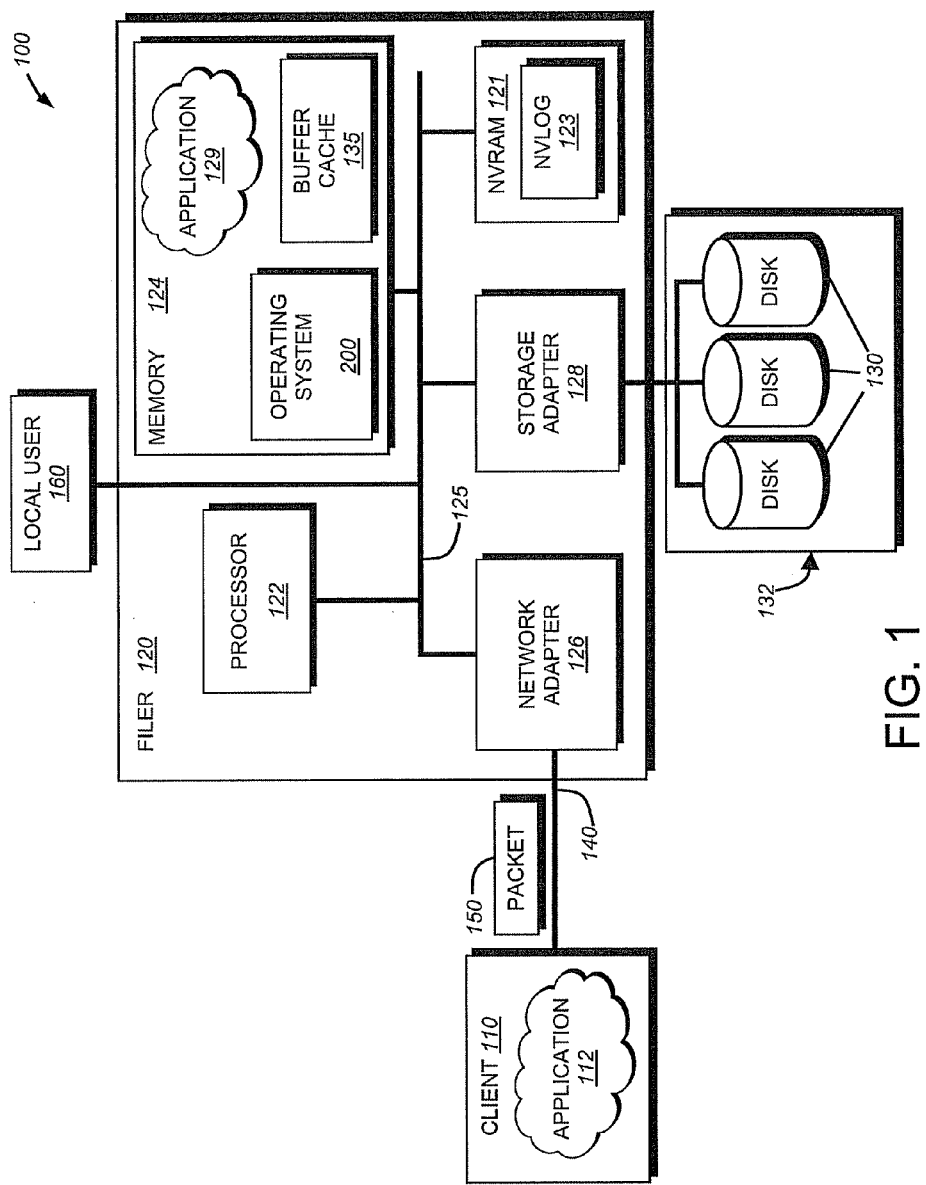
FIG. 1 is a schematic block diagram of a storage system environment including a file server.

FIG. 1 is a schematic block diagram of a storage system environment 100 that includes a client 110 having one or more applications 112, and an interconnected file server 120 that may be advantageously used with the present invention. The file server or "filer" 120 is a computer that provides file service relating to the organization of information on storage devices, such as disks 130. It will be understood to those skilled in the art that the inventive technique described herein may apply to any type of special-purpose computer (e.g., server) or general-purpose computer, including a standalone computer. The filer 120 comprises an NVRAM 121, a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks. The filer 120 may also comprise one or more applications 129 running locally within memory 124. Although only a single processor 122 is shown, those in the art will appreciate that the filer 120 may include a plurality of processors configured to execute the operating system 200 and applications 129, or portions thereof.

In the illustrative embodiment, the memory 124 comprises storage locations for data and processor instructions that are addressable by the processor 122 and adapters 126 and 128. A portion of the memory is organized as a buffer cache 135 having buffers used by the file system to store data associated with, e.g., write requests. The processor and adapters may, in turn, comprise additional processing elements, memory and/or logic circuitry configured to execute software code and manipulate data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means may be used for storing and executing program instructions pertaining to the inventive technique described herein. For example, memory 124 may comprise any combination of volatile and non-volatile computer readable media, and processor 122 may offload some processing to other specialized processors that may or may not be resident within filer 120.

Notably, the filer 120 includes an NVRAM 121 that provides fault-tolerant backup of data, enabling the integrity of filer transactions to survive a service interruption based upon a power failure, or other fault. The size of the NVRAM is variable. It is typically sized sufficiently to log a certain time-based chunk of transactions (for example, several seconds worth). An NVLOG 123 in the NVRAM 121 is filled after each client request is completed (for example, file service requests to LOAD, MODIFY, etc.), but before the result of the request is returned to the requesting client. The NVLOG contains a series of ordered entries corresponding to discrete client messages requesting file trans-actions such as "WRITE," "CREATE," "OPEN," and the like. These entries are logged in the particular order completed. In other words, each request is logged to the NVLOG at the time of completion—when the results of the requests are about to be returned to the client. The use of the NVLOG for system backup and crash recovery operations is generally described in commonly assigned application Ser. No. 09/898,894, entitled System and Method for Parallelized Replay of an NVRAM Log in a Storage Appliance by Steven S. Watanabe et al. which is expressly incorporated herein by reference.

In an illustrative embodiment, the disk shelf 132 is arranged as a plurality of separate disks 130. The disk shelf 132 may include, in some embodiments, dual connectors for redundant data paths. The disks 130 are arranged into a plurality of volumes, each having a file system associated therewith. Each volume includes one or more disks 130. In one embodiment, the physical disks 130 are configured into RAID groups so that some disks store striped data and at least one disk stores separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the Common Internet File System (CIFS) protocol or Network File System (NFS) protocol format over the network 140.

The storage adapter 128 cooperates with the operating system 200 executing on the filer to access information requested by the client. The information may be stored on disks 130 attached to the filer via the storage adapter. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

A local user 160 or administrator may also interact with the storage operating system 200 or with the one or more applications 129 executing on filer 120. The local user can input information to filer 120 using a command line interface (CLI) or graphical user interface (GUI) or other input means known in the art and appropriate I/O interface circuitry, e.g. a serial port. Thus, operating system 200 can receive file requests not only from a remote client 110, but also from a local user 160 and local applications 129.

B. Storage Operating System

Again to summarize, as used herein, the term "storage operating system" generally refers to the computer-executable code operable on a storage system that implements file system semantics (such as the previously-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
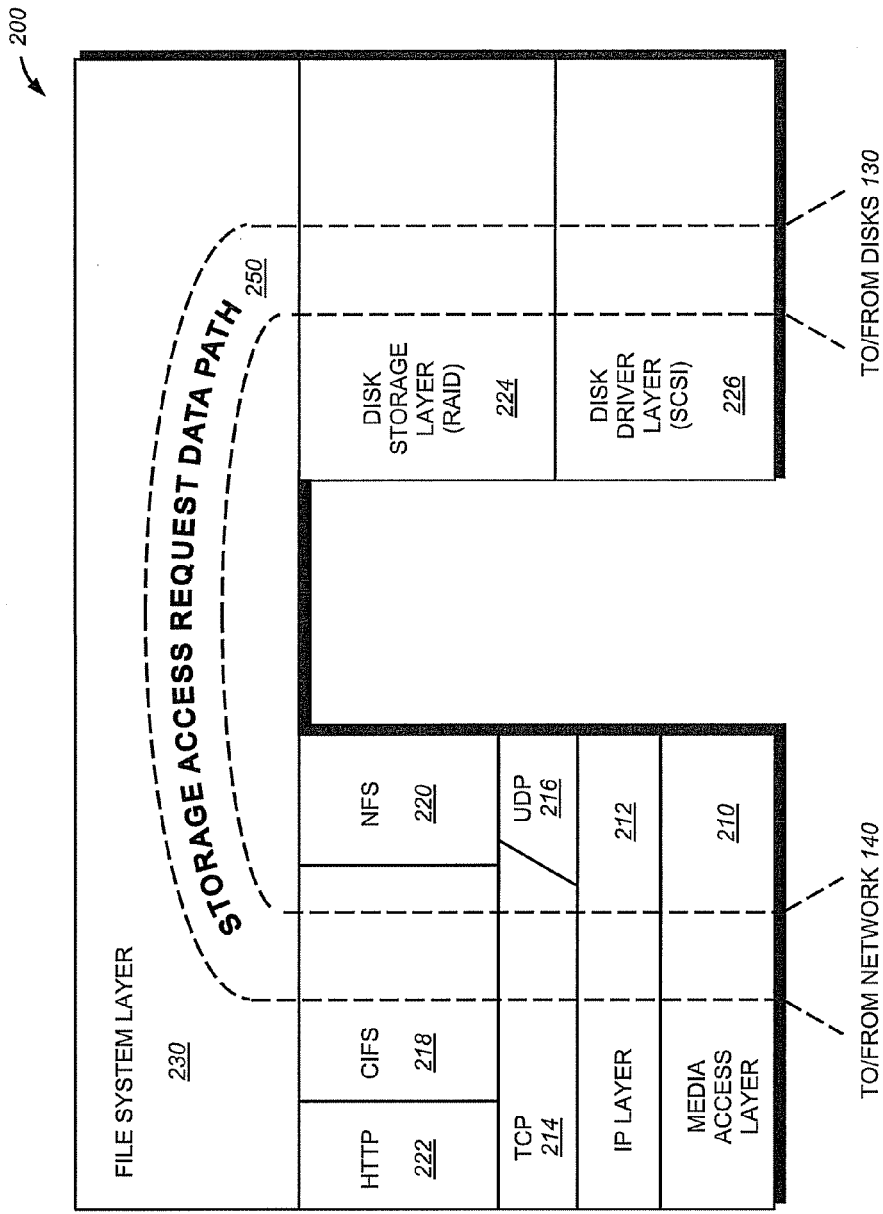
FIG. 2 is a schematic block diagram of an exemplary storage operating system for use with the illustrative file server in FIG. 1.

The organization of a storage operating system for the exemplary filer is now described briefly. However, it is expressly contemplated that the principles of this invention can be implemented using a variety of alternate storage operating system architectures. As shown in FIG. 2, the storage operating system 200 comprises a series of software layers, including a media access layer 210 of network drivers (e.g., an Ethernet driver). The operating system further includes network communication and protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In the illustrative storage operating system 200, the software layers 210-220 may be collectively referred to as a network subsystem. In addition, the storage operating system includes a disk storage layer 224 that implements a disk storage protocol, such as a RAID protocol and a disk driver layer 226 that implements a disk control protocol, such as the small computer system interface (SCSI).

Bridging the disk software layers with the network subsystem is a file system layer 230 of the storage operating system 200. Here, the file system layer and the disk software layers may be collectively referred to as a storage subsystem. Generally, the layer 230 implements a file system having an on-disk format representation that is block-based using, e.g., 4-kilobyte (KB) data blocks and using modes to describe the files. An mode is a data structure used to store information about a file, such as ownership of the file, access permission for the file, size of the file, name of the file, location of the file, etc. In response to file access requests, the file system generates operations to load (retrieve) the requested data from disks 130 if it is not resident "in-core", i.e., in the buffer cache 135. If the information is not in buffer cache, the file system layer 230 indexes into an mode file using an mode number to access an appropriate entry and retrieve a logical volume block number. The file system layer 230 then passes the logical volume block number to the disk storage (RAID) layer 224, which maps that logical number to a disk block number and sends the latter to an appropriate driver (for example, an encapsulation of SCSI implemented on a fibre channel disk interconnection) of the disk driver layer 226. The disk driver accesses the disk block number from disks 130 and loads the requested data in memory 124 for processing by the filer 120. Upon completion of the request, the filer (and storage operating system) returns a reply, e.g., a conventional acknowledgement packet defined by the CIFS specification, to the client 110 over the network 140.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110. Moreover, in another alternate embodiment of the invention, the processing elements of network and storage adapters 126 and 128 may be configured to offload some or all of the packet processing and storage access operations, respectively, from processor 122 to thereby increase the performance of the file service provided by the filer. Further, in a multiprocessor implementation, different software layers of the operating system 200 (or portions thereof) may concurrently execute on a plurality of processors 122.

C. Mbufs

Referring again to FIG. 1, when a packet of data 150 is received by filer 120 from network 140, the data is transferred from the network adapter 126 to memory 124. More specifically, storage operating system 200 allocates an area in the filer's buffer cache 135 or other suitable computer-readable medium, to store the received data in a data structure called a memory buffer or mbuf.

Figure 3:
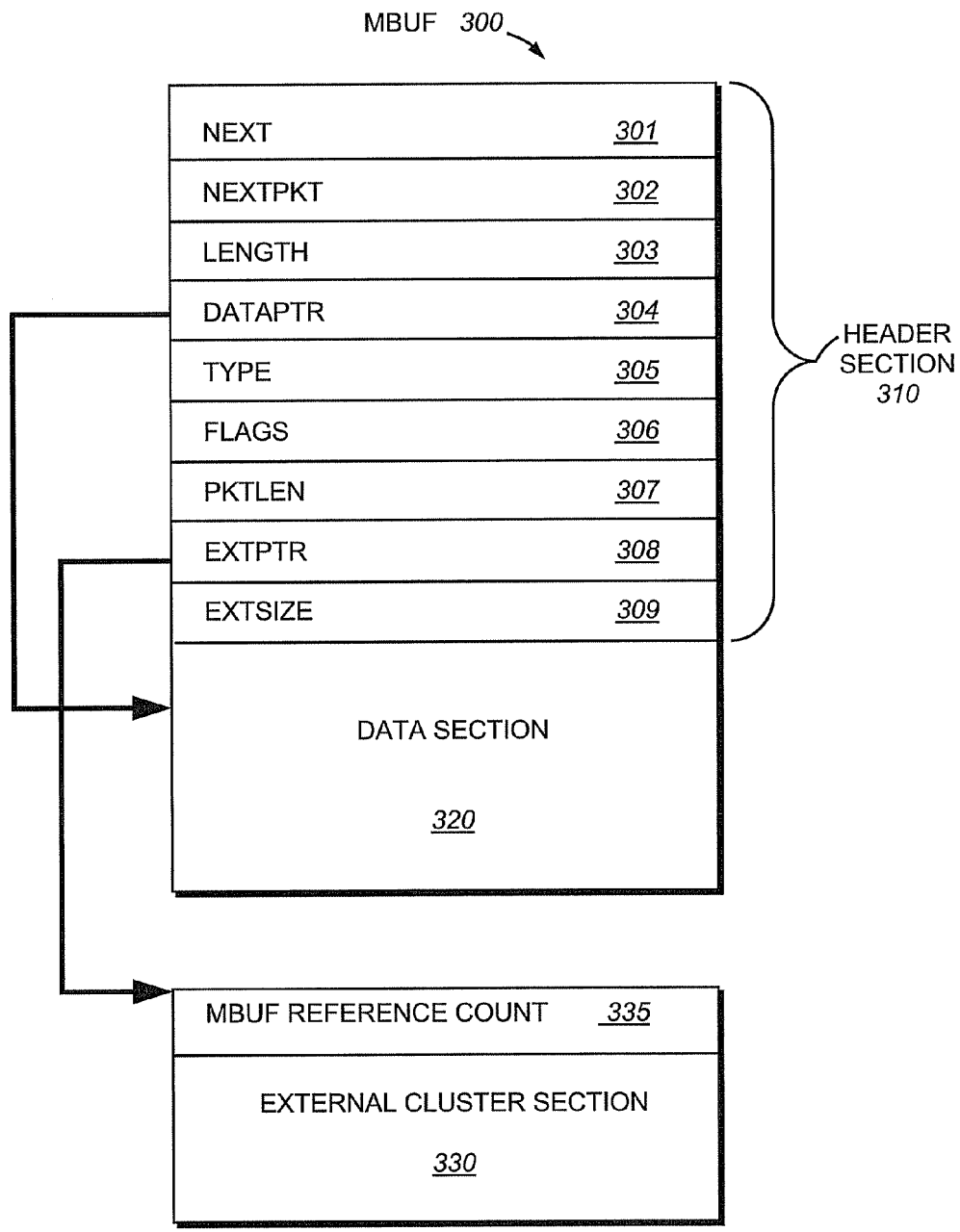
FIG. 3 is a schematic block diagram of an exemplary memory buffer data structure.

In general, mbufs are used to organize received information in a standardized format that can be passed among the different layers of a storage operating system. However, not every storage operating system uses the same mbuf structure. FIG. 3 illustrates a schematic block diagram of one exemplary mbuf, although myriad variations are expressly contemplated. For instance, in mbuf 300, fields could be added or removed from header portion 310 or the relative size of header portion 310, data portion 320 and mbuf data section 330 could be varied depending on the resources available to the operating system. Therefore, the mbuf depicted in FIG. 3 is used herein only for explanatory purposes, and the present invention is not limited to its exemplary structure.

Mbuf 300 comprises header portion 310 and data portion 320 typically having a fixed combined length, e.g. 128 bytes. Header portion 310 comprises a plurality of fields used to describe the contents of the mbuf which may include data (such as a packet) stored in data portion 320. The fields in an mbuf can be tailored to specific applications, although one representative set of fields 301-309 is included in mbuf 300. The NEXT field 301 and NEXTPKT field 302 contain pointers to other data structures, such as another mbuf. When data is received in packets, the NEXT pointer usually links mbufs storing data from the same received packet, whereas the NEXTPKT pointer usually links different data packets associated with the same overall data transmission. When data is stored in the data portion 320 of mbuf 300, the DATAPTR field 304 comprises a pointer to locate the data and LENGTH field 303 keeps track of the amount of data stored. The TYPE field 305 can indicate the type of data stored in the mbuf, e.g. packet header data and/or user data, and the FLAGS field 306 is used to indicate anomalies and special attributes, e.g. the presence of an mbuf data section or packet header, associated with the mbuf. When a received data packet spans multiple mbufs, the PKTLEN field 307 can be used to store the overall packet length.

When the data in a received packet is too large to fit in data portion 320, the mbuf may extend its data portion through use of an mbuf data section 330. The EXTPTR field 308 can store a pointer that references an mbuf data section whose size can be stored in EXTSIZE field 309. Usually, mbuf data sections are a fixed sized, e.g. 1 kilobyte or 2 kilobytes, although EXTPTR could point to mbuf data sections of any arbitrary size. Because an mbuf data section extends the data portion of an mbuf, DATAPTR field 304 may point directly to an address in the data section 330 instead of an address in data portion 320.

Furthermore, an mbuf data section may be used by more than one mbuf, so DATAPTR pointers from a plurality of mbufs could point to different addresses within the same data section 330. To keep track of the number of DATAPTR pointers referencing data stored in an mbuf data section, the data section may include an mbuf REFERENCE COUNT 335 that is incremented, e.g., by a network layer in a storage operating system, every time a new mbuf references data in the data section. Similarly, the count 335 is decremented when an mbuf no longer references data in the mbuf data section 330. In this way, the storage operating system may de-allocate and "free" the mbuf data section when its reference count is decremented to zero.

Figure 4:
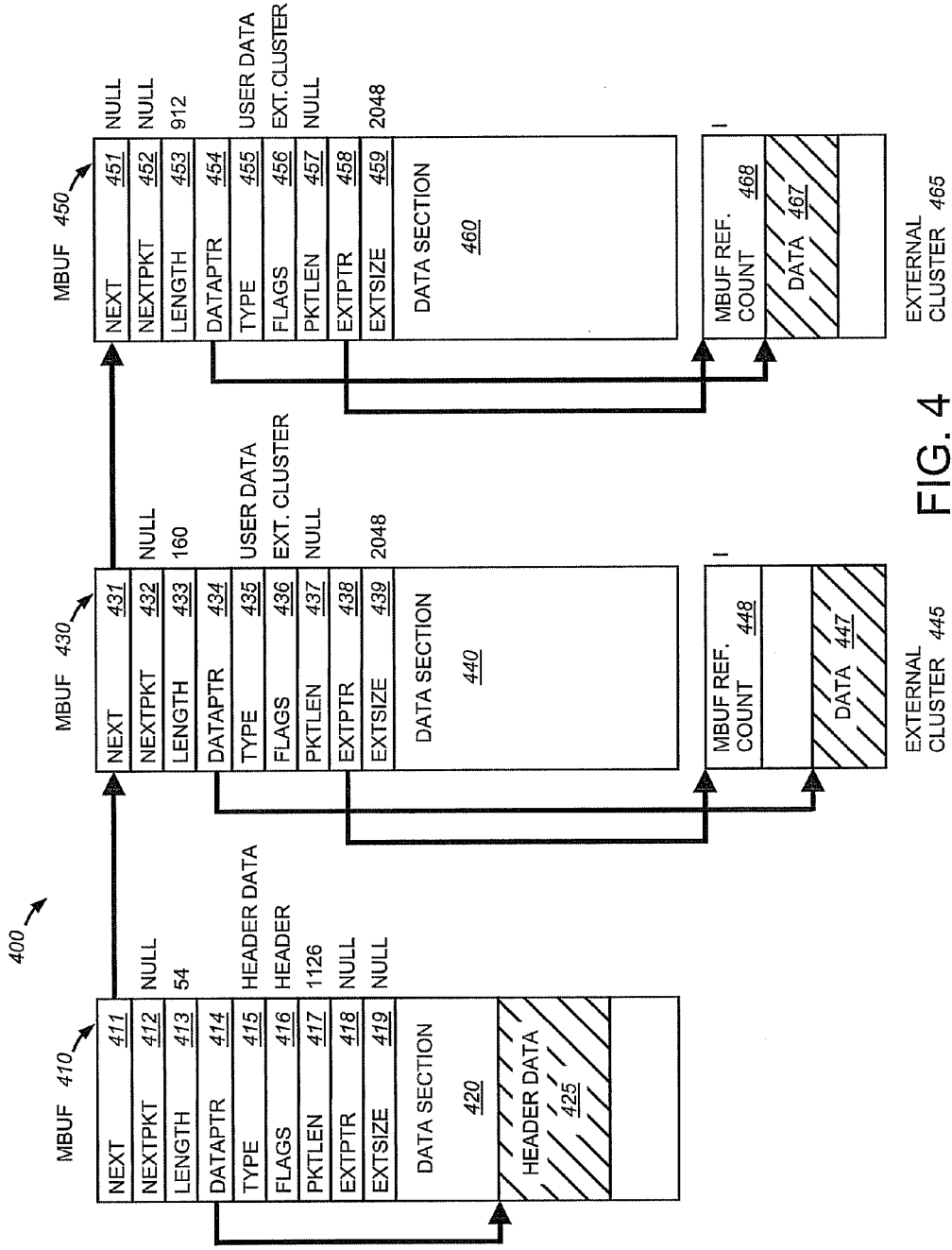
FIG. 4 is a schematic block diagram of an exemplary linked list of memory buffer data structures.

Although FIG. 3 details the structure of one exemplary mbuf, multiple mbufs are typically linked together to form chains of mbufs. That is, a data packet received from a network generally will not fit in a single mbuf and instead is stored in a linked list of mbufs. FIG. 4 illustrates an example of a packet of information 400 ("mbuf chain" 400) stored as a linked list of mbufs 410, 430 and 450. It will be understood to those skilled in the art that the chain of mbufs in FIG. 4 is representative only and any other combination of mbuf types and sizes could also be used to construct an mbuf chain. In FIG. 4, mbuf 410 stores a 54 byte packet header and mbufs 430 and 450 store 160 bytes and 912 bytes of user data respectively. Therefore, the total length of header and user data in the illustrated packet is 1126 bytes.

To form the linked list of mbufs 400, the NEXT fields 411 and 431 point to adjacent mbufs, although NEXT field 451 is set to NULL since it resides in the last mbuf of the chain. The NEXTPKT fields 412, 432 and 454 are all set to NULL since there is only a single data packet. The amount of data in each respective mbuf is stored by LENGTH fields 413, 433 and 453 and the DATAPTR fields 414, 434 and 454 locate their stored data. The PKTLEN field 417 in "leading" mbuf 410 stores the overall length of data packet 400 and subsequent PKTLEN fields 437 and 457 are set to NULL, although each mbuf in the chain could store the overall packet length. The TYPE field 415 and FLAGS field 416 indicate the data in mbuf 410 is header data whereas the TYPE fields 435 and 455 indicate mbufs 430 and 450 store user data.

Packet header data 425 is small enough to fit in data portion 420, however user data 447 and 467 are too large to fit in their respective data portions 440 and 460 and therefore require use of the mbuf data sections 445 and 465. Each of the data sections stores user data for only one mbuf, as indicated by their respective MBUF REFERENCE COUNTS 448 and 468. FLAGS fields 436 and 456 indicate mbuf data sections are being used by the mbufs 430 and 450, and EXTPTR fields 438 and 458 point to the beginning of the data sections 445 and 465. Each of the mbuf data sections in FIG. 4 can store up to 2048 bytes as indicated in EXTSIZE fields 439 and 459. In contrast, leading mbuf 410 does not reference data stored in an mbuf data section and consequently its EXTPTR field 418 and EXTSIZE field 419 are set to a NULL value.

Figure 5:
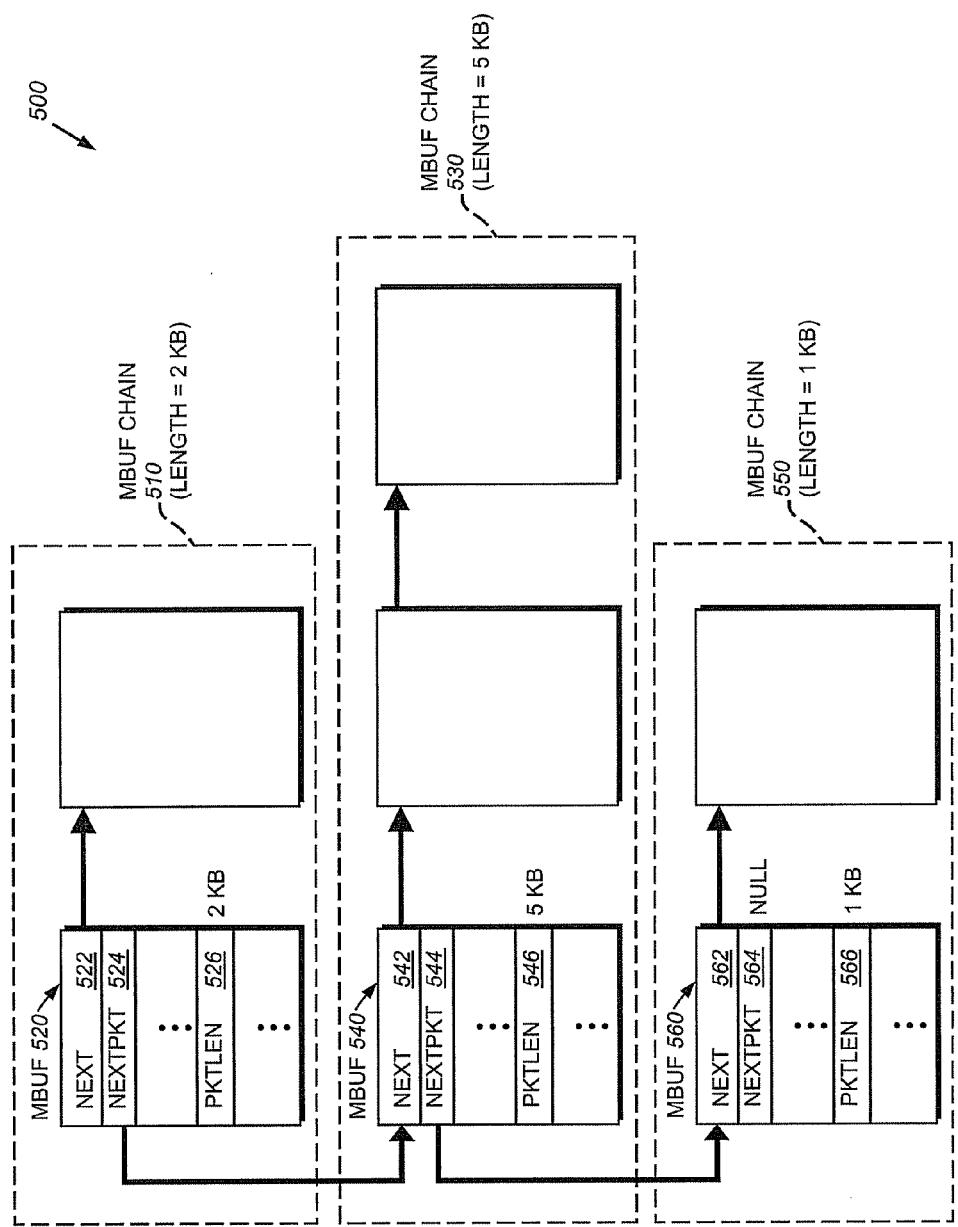
FIG. 5 is a schematic block diagram of an exemplary linked list of linked lists of memory buffer data structures.

Broadly stated, information is usually received by a filer as a plurality of data packets that may be of varying sizes. The filer's storage operating system receives each packet and stores it in a chain of mbufs as shown in FIG. 4. Thus, an overall data transmission received by a filer typically comprises an ordered sequence of mbuf chains, as shown in FIG. 5, where data transmission 500 comprises mbuf chains 510, 530 and 550. Here, a filer receives three data packets having lengths 2 kB, 5 kB and 1 kB and stores them in respective mbuf chains 510, 530 and 550. Although only three received data packets are depicted, it will be understood to those skilled in the art that the data transmission could be composed of any arbitrary number of received data packets of varying lengths. The NEXT fields 522, 542 and 562 point to adjacent memory buffers in their respective mbuf chains and the PKTLEN fields 526, 546 and 566 in leading mbufs 520, 540 and 560 store the amount of data in each mbuf chain. The NEXTPKT fields 524 and 544 link adjacent mbuf chains and NEXTPKT field 564 is set to NULL since it is stored in the last mbuf chain of the transmission.

In summary, when a filer receives data from a network, its network subsystem allocates memory buffers from the buffer cache 135 to store the received data. The memory buffers used to store in-coming data from a network can subsequently be used within the different layers of a storage operating system. Since data is often received from a network in packets of unequal sizes, linked lists of memory buffers may be employed to store a received data packet. Typically, a plurality of data packets will be associated with a single data transmission, and a linked list of memory buffer chains may store the overall data transmission.

D. Converting Mbufs to Fixed-sized Data Blocks

Storage subsystems often organize data in fixed-sized data blocks and represent files as a sequence of these data blocks. For instance, the Data ONTAP™ storage operating system, available from Network Appliance, Inc. of Sunnyvale, Calif., implements a Write Anywhere File Layout (WAFL™) file system that stores files in 4 kilobyte data blocks. However, when a network subsystem receives a file as a series of packets having various lengths, the file is usually stored in a linked list of mbuf chains, each chain storing one of the data packets. Therefore, the received data typically must be converted from the variable length mbuf chains to fixed block sizes used in the storage subsystem.

Figure 6:
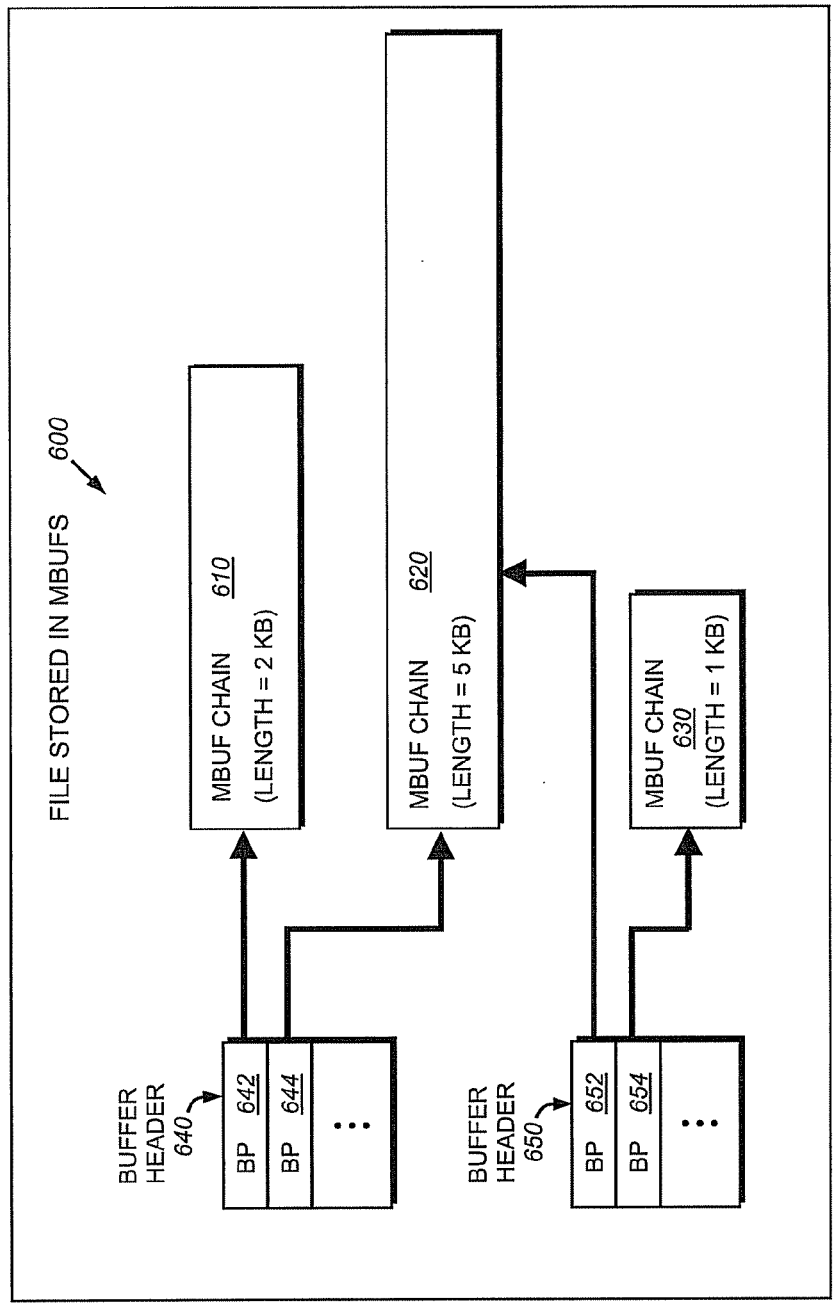
FIG. 6 is a schematic block diagram illustrating a technique that may advantageously be used in accordance with the present invention for partitioning data stored in mbufs into data blocks of a predetermined size.

In accordance with the invention, FIG. 6 is a schematic block diagram illustrating a technique that divides a file stored in variable length mbufs into fixed-sized blocks to without having to copy the contents of the mbufs into memory. Conventional techniques for partitioning received data into fixed block sizes often rely on copying the contents of mbufs into memory before dividing the data. However, the technique illustrated in FIG. 6 does not require that mbuf contents be copied to memory before being divided into fixed-sized blocks.

As shown in FIG. 6, a plurality of mbuf chains 610, 620 and 630, implicitly linked together as in FIG. 5, form overall data transmission 600. For explanatory purposes, an overall transmission of 8 kB is assumed to have been transmitted in three data packets having lengths 2 kB, 5 kB and 1 kB stored in respective mbuf chains 610, 620 and 630. Although only three received data packets are depicted, it will be understood to those skilled in the art that data transmission 600 could be composed of any arbitrary number of received data packets of varying lengths.

If it is assumed the file system manipulates data in 4 kB blocks, the 8 kB data transmission 600 can be partitioned into two fixed-sized data blocks having buffer headers 640 and 650. Although the fixed blocks illustrated are assumed to be 4 kB, the file system could partition the received file into blocks of an arbitrary predetermined size. Each buffer header comprises one or more buffer pointers that define a single fixed size, e.g., 4 kilobyte, block of data. For example, buffer header 640 is associated with a 4 kB block defined by buffer pointers 642 and 644. Buffer pointer 642 addresses 2 kB of data in mbuf chain 610, and buffer pointer 644 addresses the first 2 kB of data in mbuf chain 620. Buffer header 650 is associated with another 4 kB block of data defined by buffer pointers 652 and 654. Buffer pointer 652 addresses the remaining 3 kB of data in mbuf chain 620 and buffer pointer 654 addresses 1 kB of data stored in mbuf chain 630.

Because each fixed-sized data block in FIG. 6 is defined by one or more buffer pointers, there is not necessarily a one-to-one mapping of fixed-sized data blocks and buffer pointers. Thus, in contrast to conventional storage operating systems, there is no need to copy the contents of the mbuf chains in order to define a single buffer pointer for every data block. Instead, a storage operating system can manipulate a fixed-sized data block using one or more buffer pointers that address data stored directly in one or more of the mbuf data structures.

Figure 7:
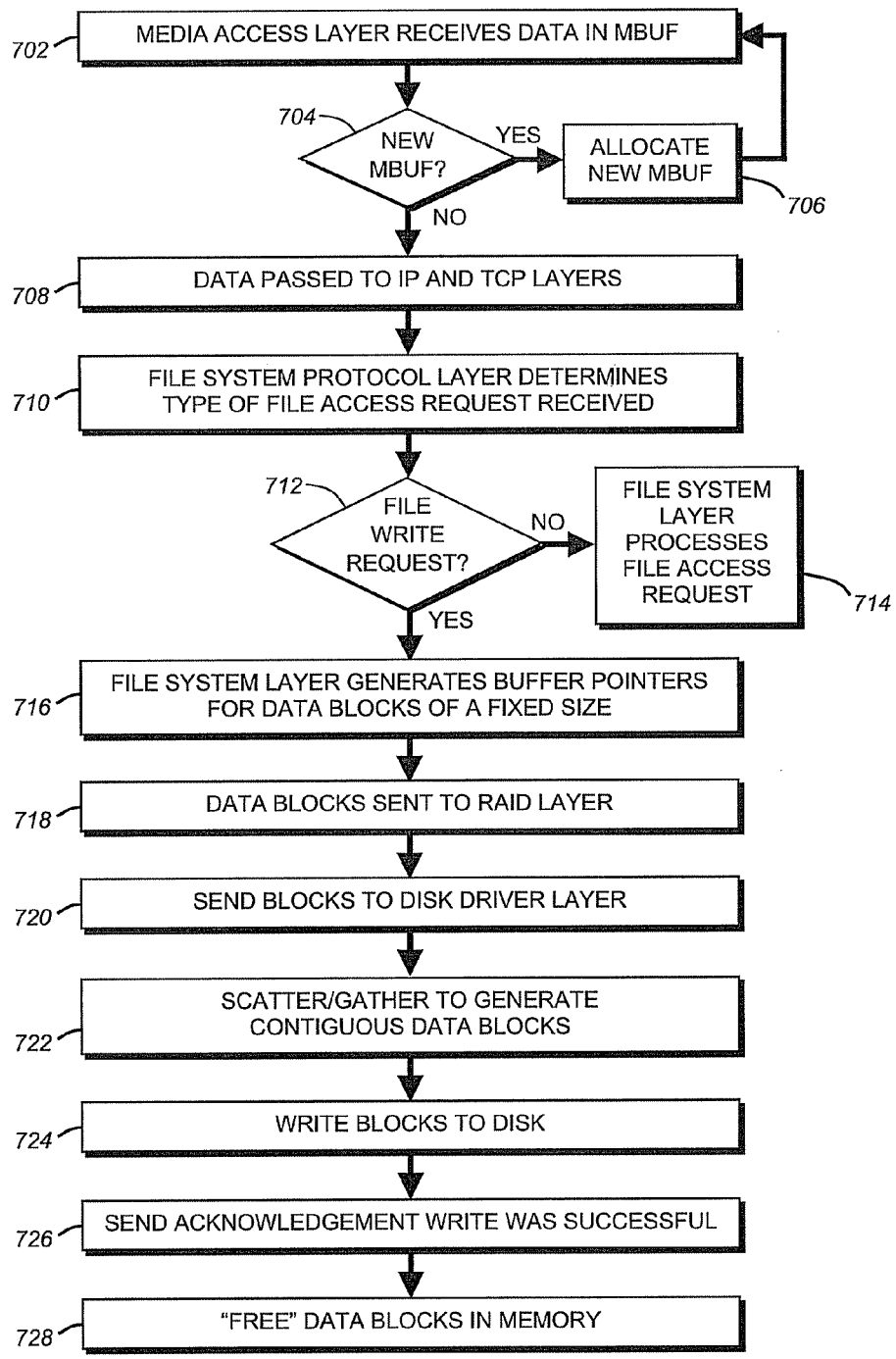
FIG. 7 is a flowchart detailing a sequence of steps that may advantageously be used in accordance with the present invention for a storage operating system to convert variable length data packets to fixed block sizes and write them to disk.

FIG. 7 is a flowchart detailing a sequence of steps for an exemplary method that may be used in the present invention to partition received data into fixed-sized blocks without copying the data from mbuf data structures into contiguous blocks of memory. The illustrated method modifies the write path of the storage operating system to directly handle mbuf data structures while other file access request paths, such as the read path, do not have to be similarly modified. At step 702, data packets are received from a network by the media access layer of a storage operating system. The operating system allocates an mbuf in its memory to store the received data, although more than one mbuf may be required if the received data spans a plurality of data packets. Therefore, at step 704, the operating system decides whether the received data can fit in the mbuf already allocated or whether a new mbuf must be additionally allocated. When a new mbuf is needed, the operating system allocates another mbuf at step 706 and keeps iteratively adding mbufs in accordance with a conventional memory allocation policy until either the received data is completely stored in chains of mbufs or the system runs out of available memory. In this latter case, the system may return an "out of memory" error message to the sender of the received data or wait until one or more mbufs are de-allocated and returned to the buffer cache's list of free mbufs.

Next, at step 708, the IP and TCP layers of the storage operating system strip network header information from the received data and forward the resultant mbufs to a file system protocol layer. In some implementations, the IP and TCP layers may additionally perform other functions such as data integrity checks and/or cryptographic functions conventionally known in the art. At step 710, the file system protocol layer determines the type of file access request that has been received. In many cases, such as a request to READ or REMOVE a file, the received data does not need to be partitioned into fixed block sizes. However, at step 712, if the file system protocol layer determines a file WRITE request has been received, the storage operating system must "divide" the received data into fixed block sizes its file system can manipulate. Similarly, step 712 may also check for file access requests besides WRITE requests that require the received data to be partitioned into equal sized segments. If the file access request does not require the data to be partitioned, the file system can process the file access request as normal at step 714.

If a file WRITE request is received, the file system layer of the present invention generates one or more buffer pointers that define consecutive fixed-sized data blocks at step 716. The one or more generated buffer pointers can address data directly in the mbuf data structures and, according to an aspect of the invention, obviate the need to copy the contents of the mbufs into memory for partitioning purposes. Thus, the file system layer can generate a plurality of buffer headers, each buffer header storing one or more pointers that define a fixed-sized data block. In the event a procedure not in the write path, i.e., a file READ request, attempts to access a fixed-sized data block of the present invention before it is written to disk, the storage operating system may convert, e.g., via a conventional scatter/gather method, the one or more buffer pointers that define the data block to a contiguous "in-core" data block that may be accessed by the procedure.

Typically, after the received data has been divided into fixed-sized blocks as defined by a set of generated buffer headers, a RAID layer receives the data blocks, or alternatively receives the buffer headers that define the data blocks, at step 718. For RAID implementations that store parity information, such as RAID-4, the RAID layer can be modified to use the buffer pointers generated at step 716 to locate consecutive fixed-sized data blocks defined by a set of buffer pointers. The RAID layer then performs exclusive- or (XOR) operations on each data block and associates a computed parity value with the data block. The RAID layer may also assign physical block numbers to each data block. At step 720, a disk driver layer, e.g. SCSI layer, receives information from the RAID layer. According to the inventive method, the disk storage layer uses a conventional scatter/gather or equivalent method to convert the set of buffer pointers that address data in one or more mbufs into contiguous fixed-sized data blocks at step 722. That is, the disk storage layer performs a translation procedure that conforms, e.g. a larger "address space" in a plurality of mbufs to a smaller address space in a fixed-sized data block.

At step 724, the disk driver layer uses information from the RAID layer, such as block numbers and parity data, to write the newly formed contiguous data blocks to disk. In an illustrative embodiment, the disk storage layer may transfer the partitioned blocks of data to a storage medium at predetermined time intervals, or consistency points (CP). More specifically, just before step 716, the received data may be copied to an NVRAM 121 and the WRITE request logged in an NVLOG 123 until a system backup operation is performed at a CP. When such a system backup occurs, the data blocks stored in the "incore" mbuf data structures are transferred to disk, as per steps 716-724, and the contents of the NVRAM and NVLOG are cleared or reset. By periodically writing data to disk in this manner, the state of the filer at the last saved CP may be restored, e.g., after a power failure or other fault, by replaying the file access requests logged in the NVLOG.

Once the data blocks have been transferred to disk storage, at step 726, the disk driver layer sends an acknowledgement back to the file system layer when the WRITE is successful and the file system layer can "free" the memory occupied by the mbuf chains. The mbufs included in the mbuf chains can then be de-allocated and designated into a pool of "free"

memory buffers in the filer's memory, at step 728, and the file system can de-allocate all buffer headers that reference the mbufs' data contents.

E. Managing Ownership of Mbufs

In accordance with the invention, ownership (i.e., control) of one or more mbufs may be transferred or shared within a network subsystem and a storage subsystem of a storage operating system. Further, an mbuf data section is not de-allocated in the storage operating system until after the data section's contained data is written to a storage medium. In a first implementation, the storage subsystem shares control of the mbufs' data sections with the network subsystem by allocating one or more "file-system proxy" mbufs. In contrast to conventional techniques, the network subsystem can not de-allocate an mbuf data section until after the storage subsystem de-allocates the file-system proxy mbufs referencing data stored in the mbuf data section. In a second implementation, ownership of one or more mbufs is transferred from the network subsystem to the storage subsystem. In this embodiment, the storage subsystem maintains ownership of the one or more mbufs by allocating a "reference-tracking" data structure for each mbuf or chain of mbufs transferred from the network subsystem. The storage subsystem does not de-allocate the mbufs until a reference count stored in the reference-tracking data structure is decremented to zero.

(i) File-System Proxy Mbufs

According to the first illustrative embodiment, a file system allocates a "file-system proxy" mbuf for each buffer pointer generated by the file system. As used herein, a file-system proxy mbuf is a conventional mbuf that serves as a means of indirection through which a buffer pointer references data stored in an mbuf data section. Because a file-system proxy mbuf is a conventional memory buffer data structure, an mbuf data section's MBUF REFERENCE COUNT is incremented when its contents are referenced by a file-system proxy mbuf. In other words, the mbuf data sections referenced by the allocated file-system proxy mbufs are guaranteed to have non-zero reference counts until the file system de-allocates the file-system proxy mbufs. Thus, unlike previous file system implementations, the file-system proxy mbufs enable the file system in the present invention to maintain control of data transferred from the networking layers without having to copy the data out of one or more mbuf data sections and into newly allocated data buffers.

In operation, the file system preferably de-allocates the file-system proxy mbufs after the data stored in the mbuf data sections is successfully copied to a storage medium. When the storage operating system is configured to transfer data from "in-core" mbuf data structures to disk storage at predetermined consistency points, the file system can de-allocate file-system proxy mbufs that reference transferred data immediately after execution of a CP. Once all the file-system proxy mbufs referencing data in an mbuf data section have been de-allocated, the data section's reference count may be decremented to zero, and the data section may be de-allocated and placed back into a list or "pool" of free (i.e., unused) mbuf data sections.

Figure 8:
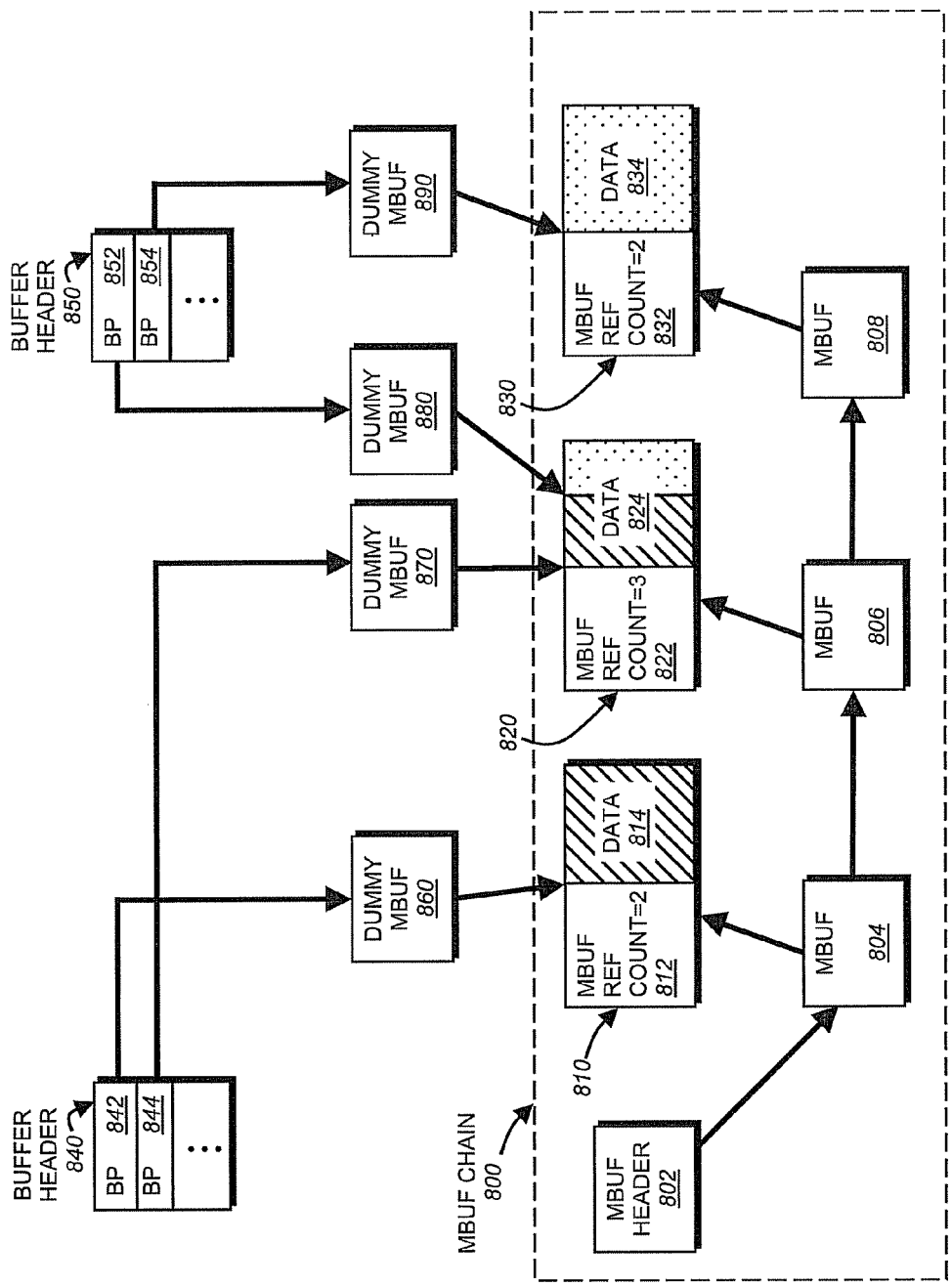
FIG. 8 is a schematic block diagram of "file-system proxy" mbufs, allocated by a file system layer of a storage operating system of the present invention, through which fixed-sized blocks of data stored in a chain of mbufs may be accessed.

FIG. 8 illustrates file-system proxy mbufs through which fixed-sized blocks of data stored in an exemplary chain of mbufs 800 may be accessed. The chain of mbufs (shown in the dotted box) comprises an mbuf header 802 and mbufs 804, 806 and 808 that respectively reference mbuf data sections 810, 820 and 830. Each of the data sections includes an mbuf REFERENCE COUNT field (812, 822 and 832) and data (814, 824 and 834). The value stored in an mbuf REFERENCE COUNT field is incremented every time an mbuf (or file-system proxy mbuf) references data contained in its associated data section. For example, the data 824 stored in mbuf data section 820 is referenced by three mbufs and thus the value stored in its reference count field 822 equals three.

In accordance with the invention, the file system partitions the data stored in the chain of mbufs without having to copy the data into fixed-sized data buffers. Instead, the file system allocates buffer headers, such as headers 840 and 850, each of which comprises a set of buffer pointers that defines a fixed-sized block of the data stored in the chain of mbufs 800. For instance, the buffer header 840 stores buffer pointers 842 and 844 that reference a fixed-sized block of data stored in the mbuf data sections 810 and 820. Similarly, buffer pointer 852 and 854 in buffer header 850 reference another fixed-sized block of data stored in the mbuf data sections 820 and 830. While two buffer pointers are illustrated in each buffer header in FIG. 8, those skilled in the art will appreciate a buffer header may store any number of pointers (i.e., one or more) to define a fixed-sized data block. Further, the buffer headers may be passed among different layers of the storage operating system as previously described in regards to FIG. 7.

As shown, each of the buffer pointers references data in the mbuf data sections through a corresponding file-system proxy mbuf. Namely, the pointers 842, 844, 852 and 854 reference data in the chain of mbufs 800 through their respective file-system proxy mbufs 860, 870, 880 and 890. Advantageously, once the file system allocates the file-system proxy mbufs 860-890, the original mbufs 802-808 may be subsequently de-allocated, and the value stored in the MBUF REFERENCE COUNT fields 812, 822 and 832 each may be decremented by one. Because the file-system proxy mbufs ensure the reference counts stored in mbuf data sections 810-830 are greater than or equal to one, the data stored in the data sections is not de-allocated even when the mbufs 802-808 are. Here, it is assumed the mbuf data sections may only be de-allocated when their reference counts equal zero. Thus, by implementing file-system proxy mbufs in this manner, the mbufs 802-808 may be reused to store new network data packets, such as file WRITE requests, even though the mbuf data sections 810-830 may not.

Figure 9:
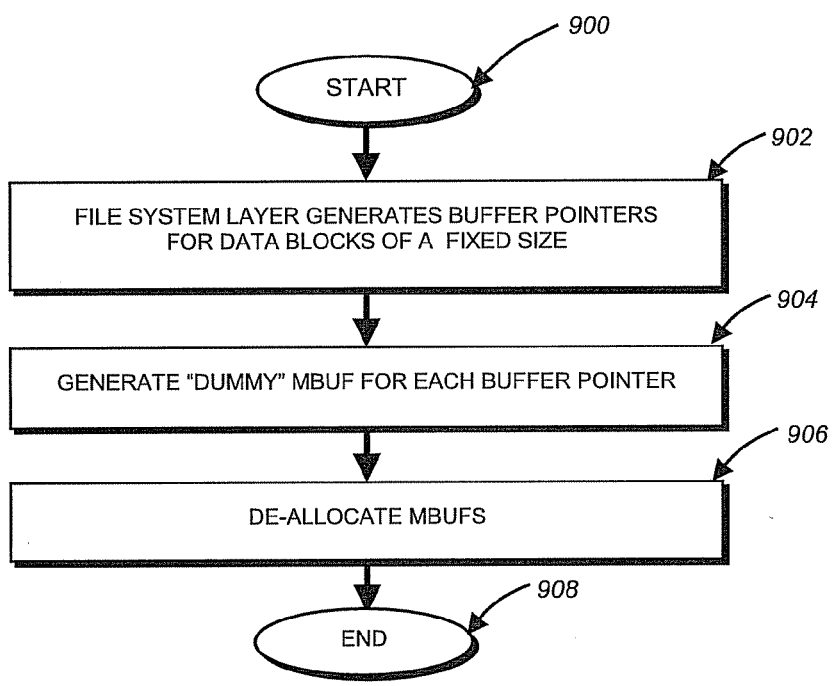
FIG. 9 is a flowchart detailing a sequence of steps, in accordance with the invention, that may be implemented by a file system that uses "file-system proxy" mbufs to take ownership of received data stored in one or more mbufs.

FIG. 9 is a flowchart that describes step 716 of FIG. 7 in accordance with the first illustrative embodiment. Specifically, the flowchart illustrates a sequence of steps that may be implemented by a file system that uses file-system proxy mbufs to take ownership of data stored in the data sections of one or more mbufs. The sequence begins at step 900 and proceeds to step 902 where the file system layer generates sets of one or more buffer pointers used to identify fixed-sized blocks of data stored in the mbuf data sections. The file system layer may store a generated set of buffer pointers defining a fixed-sized data block in a corresponding buffer header. At step 904, the file system layer generates a file-system proxy mbuf for each of the buffer pointers in a buffer header. Each buffer pointer therefore references a file-system proxy mbuf which, in turn, references a portion of the data contained in an mbuf data section. Next, at step 906, the mbuf originally associated with an mbuf data section (now referred to by a file-system proxy mbuf) is de-allocated and placed in a list or "pool" of free mbufs. The sequence ends at step 908.

(ii) Reference-tracking Data Structure

According to the second illustrative embodiment, the file system allocates a "reference-tracking" data structure that enables the file system to gain ownership of the one or more mbufs storing the received data, e.g., associated with a WRITE request. The reference-tracking data structure may comprise a reference count that is incremented every time the file system generates a set of buffer pointers defining a fixed-sized block of the received data. The reference count is decremented every time a fixed-sized data block of the received data is written to disk storage. Accordingly, the file system does not de-allocate the one or more mbufs storing the received data nor their associated reference-tracking data structure until the reference count in their associated reference-tracking data structure equals zero.

In accordance with this embodiment, one or more network layers are modified so they cannot de-allocate mbufs transferred to the file system until a reference count in the mbufs' associated reference-tracking data structure equals zero. That is, while an mbuf is conventionally de-allocated when the value of its MBUF REFERENCE COUNT field equals zero, the second illustrative embodiment instead de-allocates an mbuf when the reference count in its associated reference-tracking data structure equals zero. In addition, each buffer header in this embodiment is modified to include a pointer that references the header's associated reference-tracking structure. Operationally, when the file system generates a new buffer header, it stores a pointer in the buffer header to reference an associated reference-tracking data structure and increments a reference count in that referenced reference-tracking data structure.

Figure 10:
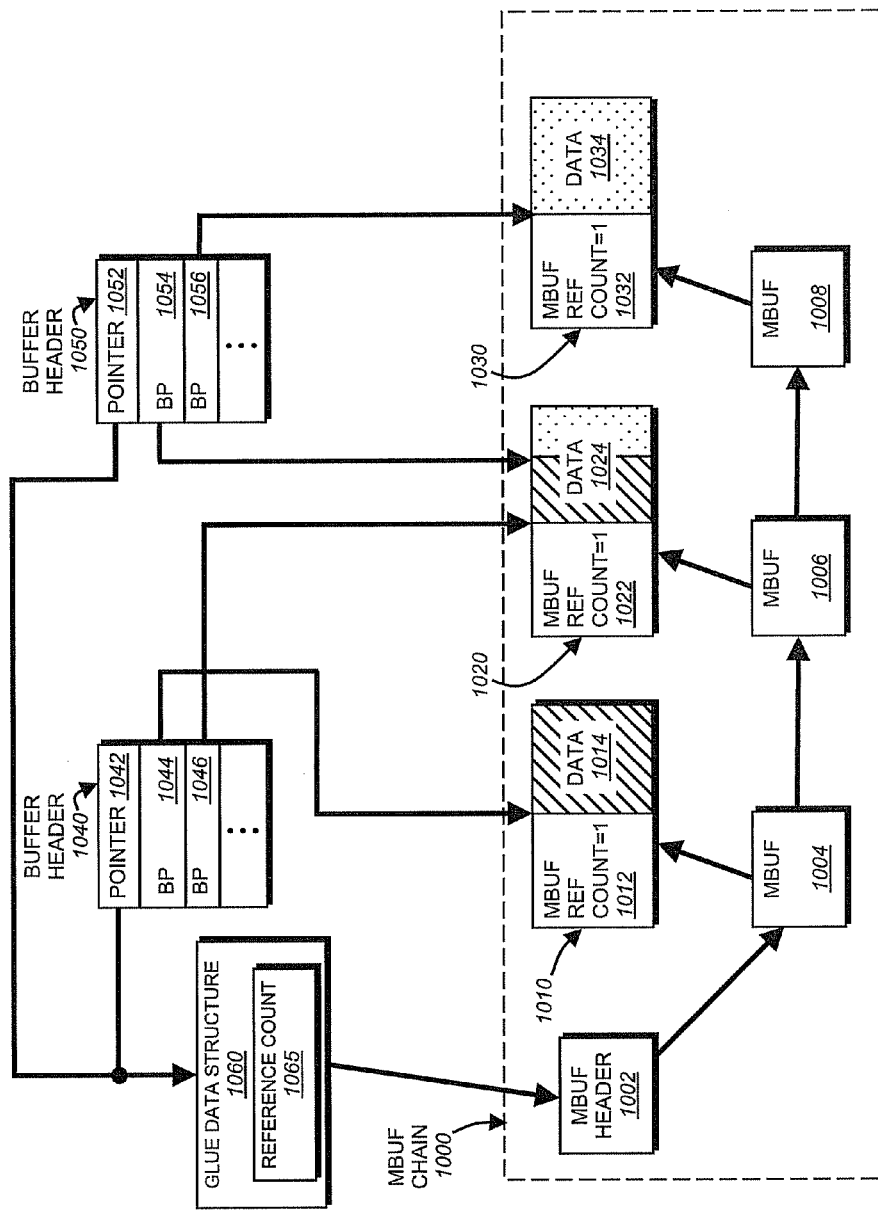
FIG. 10 is a schematic block diagram of a reference-tracking data structure, allocated by a file system layer of a storage operating system of the present invention, that controls when one or more mbufs storing received data may be de-allocated.

FIG. 10 is a schematic block diagram of a reference-tracking data structure, allocated by a storage subsystem of a storage operating system, that controls when mbufs in the exemplary chain of mbufs 1000 may be de-allocated. The chain of mbufs (shown in the dotted box) comprises an mbuf header 1002 and mbufs 1004, 1006 and 1008 that respectively reference mbuf data sections 1010, 1020 and 1030. Each of the data sections includes an mbuf REFERENCE COUNT field (1012, 1022 and 1032) and data (1014, 1024 and 1034). Since each mbuf data section is referenced by a single mbuf, the value stored in each of the fields 1012, 1022 and 1032 equals one.

Further to this illustrative embodiment, the file system partitions the data stored in the chain of mbufs 1000 without having to copy the data into fixed-sized data buffers. Instead, the file system allocates buffer headers, such as headers 1040 and 1050, each of which comprises a set of generated buffer pointers defining a fixed-sized block of the data stored in the chain of mbufs 1000. For instance, the buffer header 1040 stores buffer pointers 1044 and 1046 that reference data stored in the mbuf data sections 1010 and 1020. Similarly, buffer pointer 1054 and 1056 in buffer header 1050 reference data stored in the mbuf data sections 1020 and 1030. While two buffer pointers are illustrated in each buffer header in FIG. 10, those skilled in the art will appreciate a buffer header may store any number of pointers (i.e., one or more) to define a fixed-sized data block. Further, the buffer headers may be passed among different layers of the storage operating system as previously described in regards to FIG. 7.

The file system may generate a reference-tracking data structure associated with one or more mbufs transferred from the network layers of the storage operating system. Each generated reference-tracking structure includes a REFERENCE COUNT field that stores the number of buffer headers that contain buffer pointers referencing data stored in the reference-tracking structure's associated mbuf(s). Put another way, since each buffer header is associated with a fixed-sized data block that may be passed within layers of the storage operating system, the value of the REFERENCE COUNT field indicates the number of fixed-sized data blocks stored in the reference-tracking structure's associated mbuf(s).

For example, a reference-tracking data structure 1060 having a REFERENCE COUNT field 1065 is associated with the mbuf chain 1000. As shown, the value stored in the field 1065 equals two since two buffer headers 1040 and 1050 contain buffer pointers that reference data stored in the mbuf chain 1000. Each of the buffer headers 1040 and 1050 comprises a respective pointer 1042 and 1052 that references the reference-tracking structure 1060. Thus, the value stored in the REFERENCE COUNT field 1065 is incremented by the file system every time a pointer in a buffer header references the reference-tracking structure 1060. Likewise, the value is decremented when a pointer in a buffer header no longer references the structure.

Figure 11:
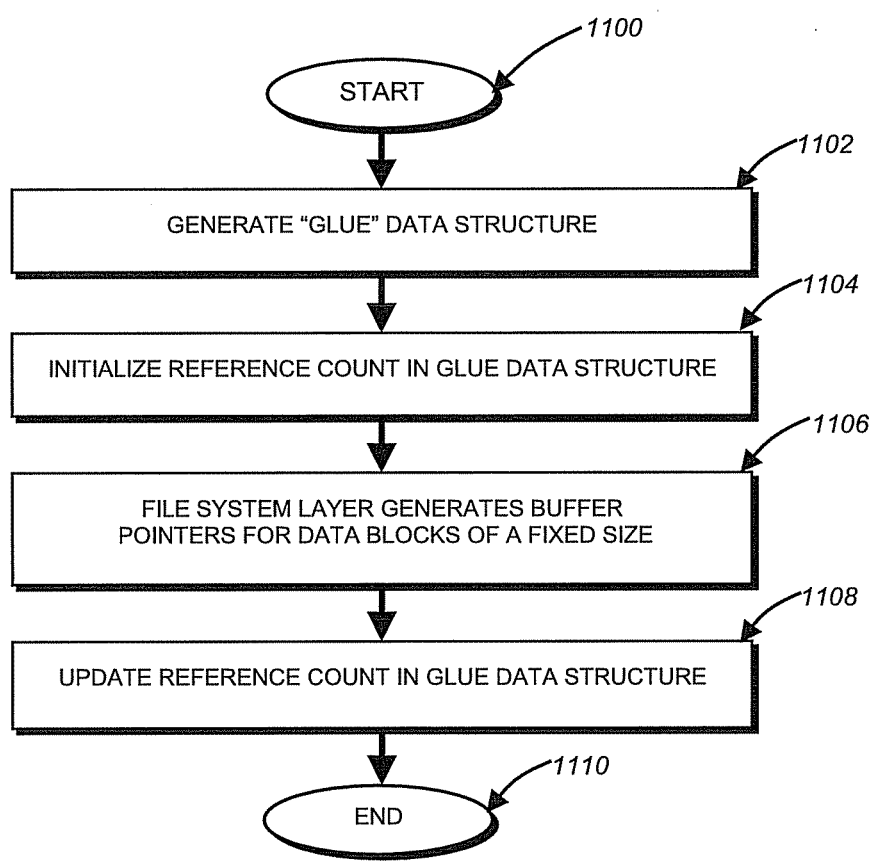
FIG. 11 is a flowchart detailing a sequence of steps that may advantageously be implemented by a file system in the present invention to take ownership of received data stored in one or more mbufs.

FIG. 11 is a flowchart that describes step 716 of FIG. 7 in accordance with the second illustrative embodiment. Specifically, the flowchart illustrates a sequence of steps that may be implemented by a file system that uses a reference-tracking data structure to take ownership of data stored in the data sections of one or more mbufs. The sequence begins at step 1100 and proceeds to step 1102 where the file system generates a reference-tracking data structure associated with one or more mbufs transferred from the network layers of a storage operating system. A REFERENCE COUNT field in the generated reference-tracking structure is initialized, at step 1104, and is preferably set to an initial value of zero.

Next, at step 1106, the file system generates sets of one or more buffer pointers used to identify fixed-sized blocks of data stored in the transferred mbufs. The file system may store a generated set of buffer pointers, defining a fixed-sized data block, in a corresponding buffer header. For each buffer header that comprises at least one buffer pointer referencing data stored in the one or more mbufs, the file system sets a pointer in the header to reference the generated reference-tracking data structure. At step 1108, the file system updates the value of the reference-tracking structure's REFERENCE COUNT field based on the number of buffer header pointers that reference the reference-tracking structure. The sequence ends at step 1110.

Figure 12:
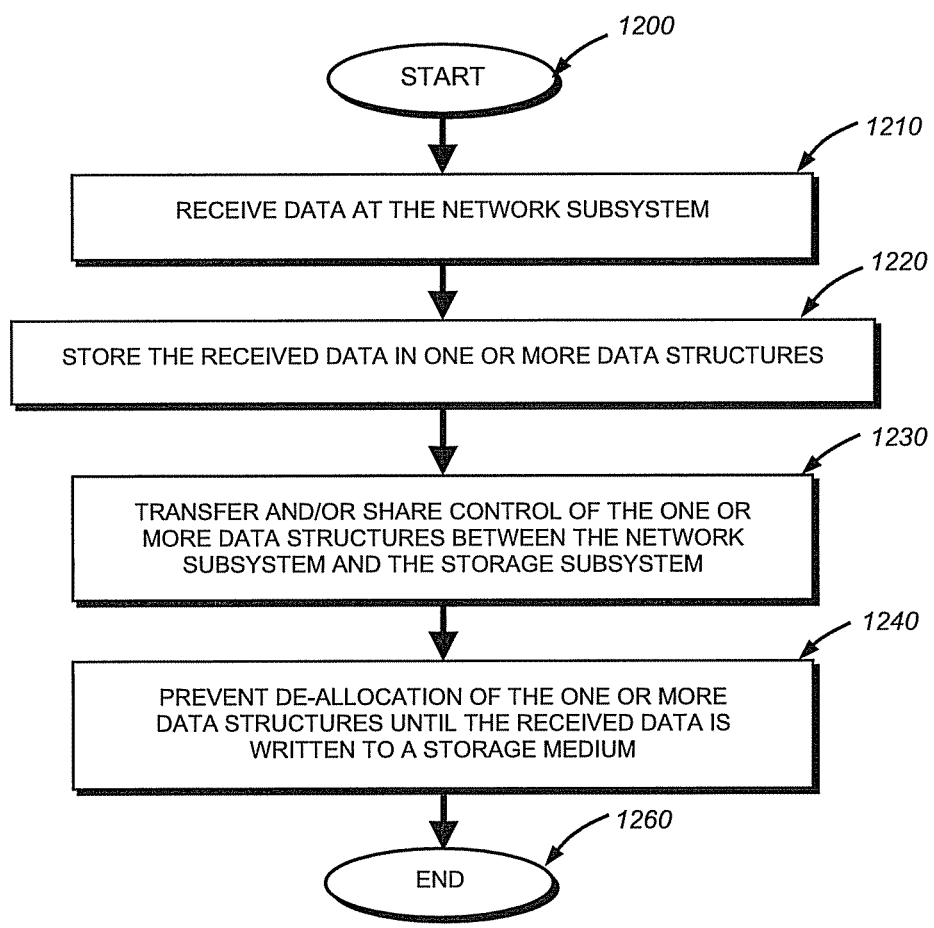
FIG. 12 is a flowchart detailing a sequence of steps that may advantageously be used in accordance with the present invention for a storage operating system to convert variable length data packets to fixed block sizes and write them to disk.

FIG. 12 is a flowchart detailing a sequence of steps for an exemplary method that may be used in the present invention to partition received data into fixed-sized blocks without copying the data from data structures into contiguous blocks of memory. The illustrated method starts at step 1200. At step, 1210, data is received at the network subsystem. At step 1220 the received data is stored in one or more data structures. At step 1230, control of the one or more data structures is transferred and/or shared between the network subsystem and the storage subsystem in the storage operating system. At step 1240 de-allocation is prevented of the one or more data structures at the storage subsystem until the received data is written to a storage medium. The method ends at step 1260.

F. Conclusion

The foregoing has been a detailed description of an illustrative embodiment of the invention. Various modifications and additions can be made without departing from the spirit and scope of the invention. While this description has been written in reference to filers and file servers, the principles are equally pertinent to all types of computers, including those configured for block-based storage systems (such as storage area networks (SAN)), file-based storage systems (such as network attached storage (NAS) systems), combinations of both types of storage systems, and other forms of computer systems. Moreover, the invention may be implemented in a storage system that functions as a network caching device configured to transmit and receive data to/from other network nodes according to a predetermined network communication protocol, such as the network file system (NFS) protocol, hypertext transfer protocol (HTTP), etc.

Although the illustrative embodiments describe writing data to a storage medium as fixed-sized data blocks, e.g., 4 kilobytes, it is also expressly contemplated that the invention is equally applicable to storage systems that write variable-sized data blocks to a storage medium. Thus, sets of buffer pointers stored in different buffer headers in the illustrative embodiments may reference variable-sized blocks of received data. For example, buffer headers 840 and 1040 may store sets of buffer pointers defining contiguous data blocks that are a different size than the contiguous data blocks defined by the buffer pointers stored in the buffer headers 850 and 1050.

Further, it is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A method for managing ownership of a plurality of data structures within a network subsystem and a storage subsystem of a storage operating system implemented by a storage system, the method comprising:

receiving data at the network subsystem through a network adapter on the storage system, wherein the data received is part of a write request;

storing the received data in the data structures;

performing at least one of transferring and sharing access of the data structures between the network subsystem and the storage subsystem of local storage operating system by the storage subsystem logically partitioning the received data into a plurality of fixed-size contiguous data blocks using a plurality of buffer pointers, wherein each buffer pointer points to a fixed-size data block;

allocating a proxy memory buffer for each buffer pointer, wherein the proxy memory buffer is configured to provide indirection through which a selected buffer pointer references a selected partitioned received data stored in an associated data structure;

incrementing a reference count of the associated data structure in response to allocating the proxy memory buffer;

de-allocating the proxy memory buffer after the storage system writes the selected partitioned received data to a storage medium in the storage system;

decrementing the reference count to zero after the proxy memory buffer has been de-allocated;

de-allocating the associated data structure; and placing the de-allocated associated data structure in a pool of free data structures in response to decrementing the reference count to zero.

2. The method according to claim 1, wherein the partitioning is completed without copying the received data from the data structures into newly allocated data buffers.

3. The method according to claim 2, wherein partitioning further comprises:

generating the buffer pointers to define each of the fixed-size contiguous data blocks.

4. The method according to claim 2, further comprising:

generating a reference-tracking data structure in response to transferring the data structures from the network subsystem to the storage subsystem, the reference-tracking data structure containing a counter that is incremented every time the storage subsystem partitions one of the fixed-size contiguous data blocks and is decremented every time the one of the fixed-size contiguous data blocks is written to the storage medium.

5. The method according to claim 4, wherein de-allocating comprises de-allocating the data structures when the value of the counter in the reference-tracking data structure equals zero.

6. The method according to claim 1, wherein the data structures are memory buffers.

7. An apparatus for managing ownership of a plurality of memory buffers within a network subsystem and a storage subsystem of a storage operating system implemented by a storage system, the apparatus comprising:

a network adapter configured to receive data at the network subsystem, wherein the data received is part of a write request;

means for storing the received data in the memory buffers;

means for performing at least one of transferring and sharing access of the memory buffers between the network subsystem and the storage subsystem in the storage operating system by the storage subsystem logically partitioning the received data into a plurality of fixed-size contiguous data blocks using a plurality of buffer pointers to eliminate copying data out of the memory buffers and into fixed-sized blocks, wherein each buffer pointer points to a fixed-size data block;

means for allocating a proxy memory buffer for each buffer pointer, wherein the proxy memory buffer is configured to provide indirection through which a selected buffer pointer references a selected partitioned received data stored in an associated data structure;

means for incrementing a reference count of the associated data structure in response to allocating the proxy memory buffer;

means for de-allocating the proxy memory buffer after the storage system writes the selected partitioned received data to a storage medium in the storage system;

means for decrementing the reference count to zero after the proxy memory buffer has been de-allocated; and means for de-allocating the associated data structure and means for placing the associated data structure in a pool of free data structures in response to decrementing the reference count to zero.

8. The apparatus according to claim 7, wherein the partitioning is completed without copying the received data from the memory buffers into newly allocated data buffers.

9. The apparatus according to claim 8, further comprising:

means for generating a reference-tracking data structure in response to transferring the memory buffers from the network subsystem to the storage subsystem, the reference-tracking data structure containing a counter that is incremented every time the storage subsystem partitions one of the fixed-size contiguous data blocks and is decremented every time the one of the fixed-size contiguous data blocks is written to the storage medium.

10. The apparatus according to claim 9, further comprising:

means for de-allocating the memory buffers when the value of the counter in the reference-tracking data structure equals zero.

11. A non-transitory computer-readable storage medium containing executable program instructions executed by a processor, comprising:

program instructions that receive data at a network subsystem of a storage system, wherein the data received is part of a write request;

program instructions that store the received data in a plurality of memory buffers of the storage system;

program instructions that perform at least one of transferring and sharing access of the memory buffers between the network subsystem and a storage subsystem in a storage operating system by the storage subsystem logically partitioning the received data into a plurality of fixed-size contiguous data blocks using a plurality of buffer pointers to eliminate copying data out of the memory buffers and into fixed-sized blocks, wherein each buffer pointer points to a fixed-size data block;

program instructions that allocate a proxy memory buffer for each buffer pointer, wherein the proxy memory buffer configured to provide indirection through which a selected buffer pointer references a selected partitioned received data stored in an associated data structure;

program instructions that increment a reference count of the associated data structure in response to allocating the proxy memory buffer;

program instructions that de-allocate the proxy memory buffer after the storage system writes the selected partitioned received data to a storage medium in the storage system;

program instructions that de-allocate the associated data structure; and program instructions that place the de-allocated associated data structure in a pool of free data structures in response to decrementing the reference count to zero.

12. The non-transitory computer-readable storage medium according to claim 11, further comprising:

program instructions that generate a reference-tracking data structure in response to transferring the memory buffers from the network subsystem to the storage subsystem, the reference-tracking data structure containing a counter that is incremented every time the storage subsystem partitions one of the fixed-size contiguous data blocks and is decremented every time the one of the fixed-size contiguous data blocks is written to the storage medium.

13. The non-transitory computer-readable storage medium according to claim 12, further comprising:

program instructions that de-allocate the memory buffers when the value of the counter in the reference-tracking data structure equals zero.

14. A storage system comprising:

a processor;

a memory configured to store a first layer of a local storage operating system executed by the processor to determine a type of file access request associated with received data;

the memory further configured to store a second layer of the local storage operating system executed by the processor to share ownership of one or more memory buffers containing the received data with the first layer, wherein in response to the first layer determining a file WRITE request was received, the second layer configured to logically partition the received data into one or more fixed-size contiguous data blocks using a set of one or more buffer pointers to eliminate copying data out of the memory buffers and into fixed-sized blocks, wherein each buffer pointer points to a fixed-size data block; and the second layer configured to allocate the set of one or more buffer pointers to define each of the one or more fixed-size contiguous data blocks, generate a proxy memory buffer for each generated buffer pointer wherein the proxy memory buffer configured to provide indirection through which a selected buffer pointer references a selected partitioned received data stored in an associated data structure, increment a reference count of the associated data structure in response to allocating the proxy memory buffer, de-allocate the proxy memory buffer after the storage system writes the selected partitioned received data to a storage medium in the storage system, decrement the reference count to zero after the proxy memory buffer has been de-allocated, and de-allocate the associated data structure and place the associated data structure in a pool of free data structures in response to decrementing the reference count to zero.

15. The storage system according to claim 14, wherein the second layer is further configured to generate a reference-tracking data structure containing a counter that is incremented every time the second layer partitions a fixed-size contiguous data block of the received data and is decremented every time the fixed-size contiguous data block of the received data is written to the storage medium, and de-allocate the one or more memory buffers when the value of the counter in the reference-tracking data structure equals zero.

* * * * *

UNITED STATES PATENT AND TRADEMARK OFFICE
CERTIFICATE OF CORRECTION

PATENT NO. : 8,473,693 B1  
APPLICATION NO. : 10/632203  
DATED : June 25, 2013  
INVENTOR(S) : Nitin Muppalaneni Page 1 of 1

It is certified that error appears in the above-identified patent and that said Letters Patent is hereby corrected as shown below:

In the Specification:

In col. 7, line 51 should read:  
4-kilobyte (KB) data blocks and using ~~modes~~ inodes to describe the In col. 7, line 52 should read:  
files. An ~~mode~~inode is a data structure used to store information In col. 7, line 59 should read:  
230 indexes into an ~~mode~~ inode file using an ~~mode~~inode number to access In col. 10, line 53 should read:  
stored in variable length mbufs into fixed-sized blocks ~~to~~

Signed and Sealed this  
Sixth Day of August, 2013

Teresa Stanek Rea  
*Acting Director of the United States Patent and Trademark Office*